(12) United States Patent
Körner et al.

(10) Patent No.: US 6,231,467 B1
(45) Date of Patent: May 15, 2001

(54) HYDRODYNAMIC MECHANICAL COMPOUND TRANSMISSION

(75) Inventors: Tillmann Körner, Zang; Martin Nitsche, Gerstetten; Martin Becke, Ulm, all of (DE)

(73) Assignee: Voith Turbo GmbH & Co., KG, Heidenheim (DE)

( * ) Notice: Subject to any disclaimer, the term of this patent is extended or adjusted under 35 U.S.C. 154(b) by 0 days.

(21) Appl. No.: 09/423,417
(22) PCT Filed: Apr. 3, 1999
(86) PCT No.: PCT/EP99/01386
  § 371 Date: Dec. 30, 1999
  § 102(e) Date: Dec. 30, 1999
(87) PCT Pub. No.: WO99/44871
  PCT Pub. Date: Sep. 10, 1999

(30) Foreign Application Priority Data

Mar. 6, 1998 (DE) .............................. 198 09 467
Mar. 6, 1998 (DE) .......................... 298 03 792 U (51) Int. Cl.[7] .................................................. B60T 1/087
(52) U.S. Cl. ............................................................ 475/113
(58) Field of Search ............................................. 475/113

(56) References Cited

U.S. PATENT DOCUMENTS 4,497,219 * 2/1985 Elsner ................................ 475/113
4,726,255 * 2/1988 Humpfer et al. ................. 475/113

FOREIGN PATENT DOCUMENTS 2 156 002    3/1973  (DE).
25 21 831   11/1976  (DE).
36 04 393    8/1986  (DE).

OTHER PUBLICATIONS

English Translation of International Search Report dated Jul. 2, 1999.

* cited by examiner

Primary Examiner—Dirk Wright
(74) Attorney, Agent, or Firm—Marshall, O'Toole, Gerstein, Murray & Borun (57) ABSTRACT

The invention relates to a hydrodynamic mechanical compound transmission comprising a transmission input shaft (E), a transmission output shaft (A), a hydrodynamic transmission part (2) and a mechanical transmission part (4). Said mechanical transmission part (4) comprises at least one speed/torque conversion device (5). The output of the mechanical speed/torque converter (5) is at least indirectly drive-connected to the transmission output shaft (1). According to the invention, the hydrodynamic retarder (25) which comprises a stator (26) and a rotor blade wheel (27) is spatially integrated in the transmission housing (11). In addition, the rotor blade wheel (27) of the hydrodynamic retarder (25) is at least indirectly coupled to the output shaft (A) of the mechanical speed/torque converter (5). The hydrodynamic retarder (25) functions as a secondary retarder, however, it is spatially arranged in the transmission before the downstream stage (6).

33 Claims, 9 Drawing Sheets

FIG. 1

| Gear | Clutch | | Brake | | | | i |
|---|---|---|---|---|---|---|---|
| | K1 | K2 | B1 | B2 | B3 | B4 | |
| 1. | – | O | – | – | O | – | 3,08 |
| 2. | – | – | – | – | O | O | 2.39 |
| 3. | – | O | O | – | – | – | 1.67 |
| 4. | – | – | O | – | – | O | 1.29 |
| 5. | O | O | – | – | – | – | 1,00 |
| 6. | O | – | – | – | – | O | 0.78 |
| R | – | O | – | O | – | – | -1,50 |

– = Disengaged

O = Engaged

HYDRODYNAMIC MECHANICAL COMPOUND TRANSMISSION

The invention concerns a hydrodynamic-mechanical compound transmission, especially with the features from the preamble of claim 1.

Hydrodynamic-mechanical compound transmissions, comprising a hydrodynamic speed/torque converter and a mechanical transmission part, are known in a number of versions. Document DE 36 04 393 C2 discloses a hydrodynamic compound transmission, comprising a torque converter and a gearbox connected to it in series. The gearbox has two planet wheel sets for this purpose, in which the planet carriers of the two planet wheel sets are coupled to each other and form the output of the gearbox. The number of required planet wheel arms or planet wheel sets (under some circumstances, a Ravigneaux set) can be kept low with this type of arrangement, and with appropriate arrangement of switching devices, at least three speeds can be implemented, during which the axial design length can be kept very short. The hydrodynamic speed/torque converter comprises a pump wheel, turbine wheel, as well as two guide wheels—a first guide wheel and a second guide wheel, means being provided that permit coupling of the turbine wheel and the first guide wheel to the mechanical transmission part in the form of a gearbox: in particular, the overall transmission input shaft can be connected either via the hydrodynamic speed/torque converter and then via the turbine wheel to the sun wheel of one planet wheel set of the mechanical transmission part, or directly via a so-called bypass clutch to it. The first guide wheel is connected via a freewheel to the sun wheel of the other second planet wheel set of the mechanical transmission part. The characteristic properties of the speed/torque converter in each range of transmission ratio and the transmission ratio of the mechanical transmission part are changed by switching the transfer path of the torque, starting from the first guide wheel shaft by alternating activation of coupling and/or braking devices that permit either stopping of the first guide wheel shaft or clutch of the first guide wheel shaft to the turbine wheel shaft and thus the first sun wheel of the first planet wheel set. The advantage of this 3-speed transmission consists of its limited design size. However, a corresponding layout of this existing transmission with respect to the main use or a costly modification of it is required in order to optimize certain parameters, like fuel consumption of the vehicle or to permit higher final design speeds of the vehicle.

The underlying task of the invention is to further develop a transmission of the type mentioned at the outset, so that this can fulfill the existing use requirements more optimally, in which the advantages of low weight and limited design size are also to be retained. Additional functions, like creation of a braking torque or driving of secondary units, as well as implementation of overdrive with the least possible expense, while retaining the advantages of limited design size, are to be implemented with limited design cost.

The task of the invention is characterized by the features of claim 1. Advantageous embodiments are stated in the subclaims.

The hydrodynamic-mechanical compound transmission comprises a first hydrodynamic transmission part and an additional second mechanical transmission part. The first hydrodynamic transmission part comprises a hydrodynamic speed/torque converter. The mechanical transmission part comprises at least a mechanical speed/torque converter. Preferably, a mechanical speed/torque converter is used, having at least two planet wheel sets, whose planet carriers are connected to each other and form the output of the mechanical speed/torque converter. The transmission also has a hydrodynamic retarder, which is integrated in the housing and is arranged in spatial proximity to the hydrodynamic transmission element, the hydrodynamic retarder being coupled to the output of the mechanical speed/torque converter. Coupling then occurs preferably by connection of the rotor blade wheel to rotate in unison with the coupled transmission elements, preferably the planet carriers that simultaneously form the output of the mechanical speed/torque converter.

The arrangement of the hydrodynamic retarder according to the invention, which is characterized by integration in the transmission housing and spatial arrangement of the retarder referred to the power flow direction from the transmission input shaft to the transmission output shaft before the mechanical transmission part, in which the rotor blade wheel of the hydrodynamic retarder can be connected to the output shaft of the mechanical transmission part, i.e., arrangement of the hydrodynamic retarder in the immediate spatial vicinity of the hydrodynamic transmission element, makes it possible to integrate all hydraulic components of the operating medium supply system, like gear pump, starting converter, control unit and supply lines, spatially next to each other in the transmission, in which only short paths are required to guide, the operating medium, which has a significant effect on the method of operation of the transmission, for example, a reduction of the response times during start-up of hydrodynamically operating components, like the hydrodynamic speed/torque converter and hydrodynamic retarder, reduction of hydraulic resistance and increase in energy efficiency.

The first hydrodynamic transmission part and the mechanical speed/torque converter form a so-called basic transmission module or core transmission, which can be furnished as a complete assembly group. This is preferably expandable by a secondary set, which is arranged coaxial to the base transmission module and, viewed spatially in the power flow direction in traction operation, is arranged either in front of the mechanical speed/torque converter or behind it. The output of the mechanical speed/torque converter then simultaneously forms the input of the secondary stage. However, the hydrodynamic retarder according to the invention, viewed in the power flow direction in traction operation, is always arranged in front of the take-off or output of the secondary set. The following two possibilities are essentially obtained for additional arrangement possibilities with reference to the mechanical speed/torque converter of the mechanical transmission part:

1. Arrangement of the retarder, viewed in the power flow direction in traction operation spatially in front of the mechanical speed/torque converter.
2. Arrangement of the hydrodynamic retarder, viewed in the power flow direction in traction operation spatially behind the mechanical speed/torque converter.

In the first mentioned possibility of arranging the secondary set, viewed spatially in the power flow direction in traction operation spatially in front of the mechanical speed/torque converter, two possibilities are again obtained for integration of the hydrodynamic retarder, which are also combinable with the two possibilities just mentioned:

1. Arrangement of the hydrodynamic retarder between the secondary set and the mechanical speed/torque converter.
2. Arrangement of the hydrodynamic retarder, viewed in the force flow direction in traction operation spatially in front of the mechanical secondary stage.

By analogy, these assertions also apply to arrangement of the secondary set, viewed in the power flow direction in traction operation spatially behind the mechanical speed/torque converter.

The described basic variants permit the design of an overall transmission with integrated braking function with simultaneously limited design size and limited weight, in which additional speeds can be implemented by means of the secondary set and by corresponding layout of the individual transmission elements of the mechanical speed/torque converter in conjunction with the mechanical secondary stage, an essentially uniform traction force trend is achieved over the entire operating range.

Design integration of a hydrodynamic retarder and its central arrangement in the overall transmission, especially in front of the mechanical speed/torque converter, makes it possible to implement a right-angle gear drive on the transmission, and also to provide central supply of the operating medium, as already mentioned above, for the hydrodynamic transmission element and the hydrodynamic retarder, instead of individual operating medium supply systems.

The hydrodynamic retarder is therefore arranged in the overall transmission so that it represents a mixture of primary and secondary retarder with respect to its function. The hydrodynamic retarder does not function as a pure primary retarder, since these are generally arranged in front of the mechanical transmission assemblies, but does not function as a pure secondary retarder either, since these are always generally connected in front of the transmission output shaft. A mechanical transmission stage is arranged between it and the transmission output either in a pure 3-speed transmission in the form of the mechanical speed/torque converter, or in a transmission arrangement of a hydrodynamic transmission part and a mechanical speed/torque converter with mechanical secondary stage, at least in front of the mechanical secondary stage when viewed spatially, so that this can act directly on the output in the power flow direction via the secondary stage. Driving can occur via controls, so that, viewed from a mechanical standpoint, all the properties of a secondary retarder or of a primary retarder are achieved. The switchback philosophy can be used alternately or intelligently.

Combination with the secondary stages permits multiple speeds, which again means that the operating range to be covered can be implemented with a number of gears, and preferably at least one overdrive or a so-called overdrive gear is provided, in which an optimal adjustment by means of higher gear spread ($phi_{tot}$) can lead to minimal fuel consumption range of the drive machine in different motors and rear axles. The speed jumps (phi) of the mechanical transmission part are therefore chosen so that ranges smaller than or equal to 1.45 are used. A range of 2.75–3.50 to be implemented in $1^{st}$ gear is then obtained for the admissible transmission ratios i. Because of this, it is possible to permit transfer of the traction trend from the hold-gears into the suitable power transfer gears (i.e., the gears in which power transfer occurs from the transmission input shaft to the mechanical transmission part via coupling or hold-gear bypass coupling and thus bypassing the hydrodynamic transmission part) at relatively low speeds without loss of traction. Because of this, continuous traction trends are uniformly obtained in the lower hold-gears, and in the upper gears the small speed jump also has a fuel-saving effect, since a fuel-saving gear can be selected at each operating point below the legal driving speed.

The spatial arrangement of the hydrodynamic retarder makes it possible to devise a transmission module in simple fashion, which comprises a base transmission, including hydrodynamic transmission element, as well as the mechanical speed/torque converter, and which can be combined with appropriately configured secondary stages. In this case, the hydrodynamic retarder can be either a component of the base transmission or of the transmission part, which can be flanged to the base transmission and comprises the secondary stage. At least three speeds can be implemented with the base transmission itself, whereas additional gears can be produced after layout of the secondary stage. The secondary stage is preferably designed as a simple planet wheel set, in which switching devices in the form of braking and/or clutch devices are connected to this to implement the group function. The secondary stage, or at least its drive and driven elements, are then always arranged coaxial to the base transmission. By implementing a module system consisting of a base transmission and secondary set, the design costs for the overall transmission can be kept low.

The secondary stage in the present case serves to split the three speeds implementable with the base transmission into two partial speeds. This means that the individual gears follow each other by alternate activation of corresponding switching devices, clutch and/or braking devices on the secondary stage. Two consecutive gears, starting from $1^{st}$ gear, are therefore essentially characterized by activation of the same switching devices in the base transmission.

An example of a particularly advantageous design according to the invention is laid out in detail as follows:

The hydrodynamic transmission element comprises at least one pump wheel, a turbine wheel, as well as a guide wheel device, comprising a first guide wheel and a second guide wheel. The second guide wheel is connected to the transmission housing via a freewheel. The first guide wheel is in drive connection with the mechanical speed/torque converter via a so-called guide wheel shaft. The mechanical speed/torque converter has at least two planet wheel sets, a first planet wheel set and a second planet wheel set, each planet wheel set having a sun wheel, ring gear, planet wheels and a planet carrier. The two planet wheel sets—first planet wheel set and second planet wheel set—are coupled to rotate in unison with each other with respect to a transmission element. The first transmission element of the first planet wheel set, which is connected to rotate in unison with a first transmission element of the second planet wheel set, is preferably formed by the planet carrier of the corresponding planet wheels set. The two sun wheels of the individual planet wheel sets, the first planet wheel set and the second planet wheel set, form the inputs of the mechanical speed/torque converter. The first input, which is coupled to the sun wheel of the first planet wheel set, is connected via a freewheel to the first guide wheel of the hydrodynamic speed/torque converter. The sun wheel of the second planet wheel set is preferably connectable to the turbine wheel shaft, which can be connected either via the hydrodynamic speed/torque converter or bypass clutch to the transmission input shaft. The hydrodynamic speed/torque converter is arranged in the transmission so that its stator blade wheel can be fastened to the transmission housing, whereas the rotor blade wheel is preferably coupled to the output of the mechanical speed/torque converter. This output is formed by the coupled transmission elements of the two planet wheel sets, preferably the coupling of the planet carrier in the present case. The output of the mechanical speed/torque converter forms the input of the mechanical secondary stage and is thus coupled to the transmission output shaft via the corresponding speed. The hydrodynamic retarder acts on the transmission output shaft via the secondary stage and therefore exerts the function of secondary retarder. The rotor blade wheel of the hydrodynamic retarder also experiences transmission through the secondary stage. Over the entire operating range, the hydrodynamic retarder, referred to the speed of the output shaft, is operable with two different transmission ratios. Coupling of the hydrodynamic retarder to the output shaft occurring in this manner also makes it possible to implement a braking process in normal operation, in which the change in filling of the hydrodynamic retarder required to achieve an optimal braking behavior by adjustment of the filling to the braking torque to be generated, need occur only in the next speed but one, i.e., continuous filling controls during a change from one gear to the next are not required. To achieve gear-independent equal braking torques, filling of the retarder must be greater during a speed increase of the secondary group than at a "direct transmission ratio" of 1.0. Filling must be adjusted according to the switchback strategy when all gears are switched back in succession. Filling need not be adjusted if backswitching only occurs to each second gear. Coupling of the hydrodynamic retarder to the output shaft occurring in this manner makes it possible to always implement optimal braking processes and to achieve optimal braking behavior.

To implement the individual speeds, switching devices in the form of braking devices and clutch devices are provided, these preferably in lamellar design. The individual switching devices are operated according to the desired gear to be set and the obtainable transmission ratio. For this purpose, a transmission control is preferably prescribed. A first braking device then serves to fix the guide wheel shaft and thus the sun wheel of the first planet wheel set. A second braking device serves to fix the ring gear of the first planet wheel set, and a third braking device to fix the ring gear of the second planet wheel set of the mechanical speed/torque converter. An additional fourth braking device serves to fix the sun wheel of the secondary stage. A first clutch element serves to implement connection of the sun wheel of the first planet wheel set and the sun wheel of the second planet wheel set to rotate in unison.

During arrangement of the secondary stage, viewed in the power flow direction from the transmission input shaft to the transmission output shaft spatially in front of the mechanical speed/torque converter, there is a possibility of implementing additional outputs in a simple manner. The mere arrangement of the mechanical secondary stage in front of the mechanical speed/torque converter forms a first base configuration that is characterized by the implementation of a multiple speed transmission, especially a six-speed transmission, with simultaneous design space reduction, especially when the space demands relative to the base transmission remain the same. The secondary stage is preferably also designed in the form of a simple planetary geartrain, but in which only one switching element in the form of the fourth braking device is provided, which serves to fix the sun wheel. Otherwise, the planet arm of the mechanical secondary stage is coupled to the planet arm of the mechanical speed/torque converter device. Because of this, it is possible to implement three speeds without activation of a switching element on the secondary stage, since the arm of the secondary stage rotates with the same speed as the output of the mechanical speed/torque converter device. The output of the secondary set is formed by the ring gear. This is in drive connection with additional speed/torque transferring elements, for example, with a spur gear or, depending on the configuration of the toothing of the ring gear, also a bevel gear. During design of the transmission, the resulting transmission ratios are incorporated on this account. There is the additional possibility of providing secondary outputs, in addition to the main output, which is arranged parallel to the axis of symmetry of the transmission. These can be directly coupled, for example, to the output of the mechanical speed/torque converter, i.e., preferably on the arm. The secondary output can then simultaneously also be a second main output, so that the main transmission is modified in simple fashion to a transmission capable of all-wheel drive. In this case, the first main output occurs via a shaft parallel to the axis of symmetry of the transmission, preferably via the ring gear of the mechanical secondary stage, whereas the second main output can be connected to the output of the arm of the mechanical speed/torque converter, and lies in front of it. The two outputs are arranged at an angle to each other—the first output runs coaxial to the theoretical transmission axis, whereas the second output is perpendicular to this axis, in which both are preferably designed as identical planet wheel sets, and the planet wheel set forming the perpendicular output, preferably directly via the ring gear, is arranged in front of the mechanical speed/torque converter, and it is therefore essential, especially for all-wheel drive, to provide a corresponding speed/torque converter device that makes it possible to implement the two outputs arranged at an angle to each other on two essentially parallel driveshafts. In this case, preferably a transfer stage is implemented by means of bevel gears.

The design according to the invention is explained below with reference to figures.

Figure 1:
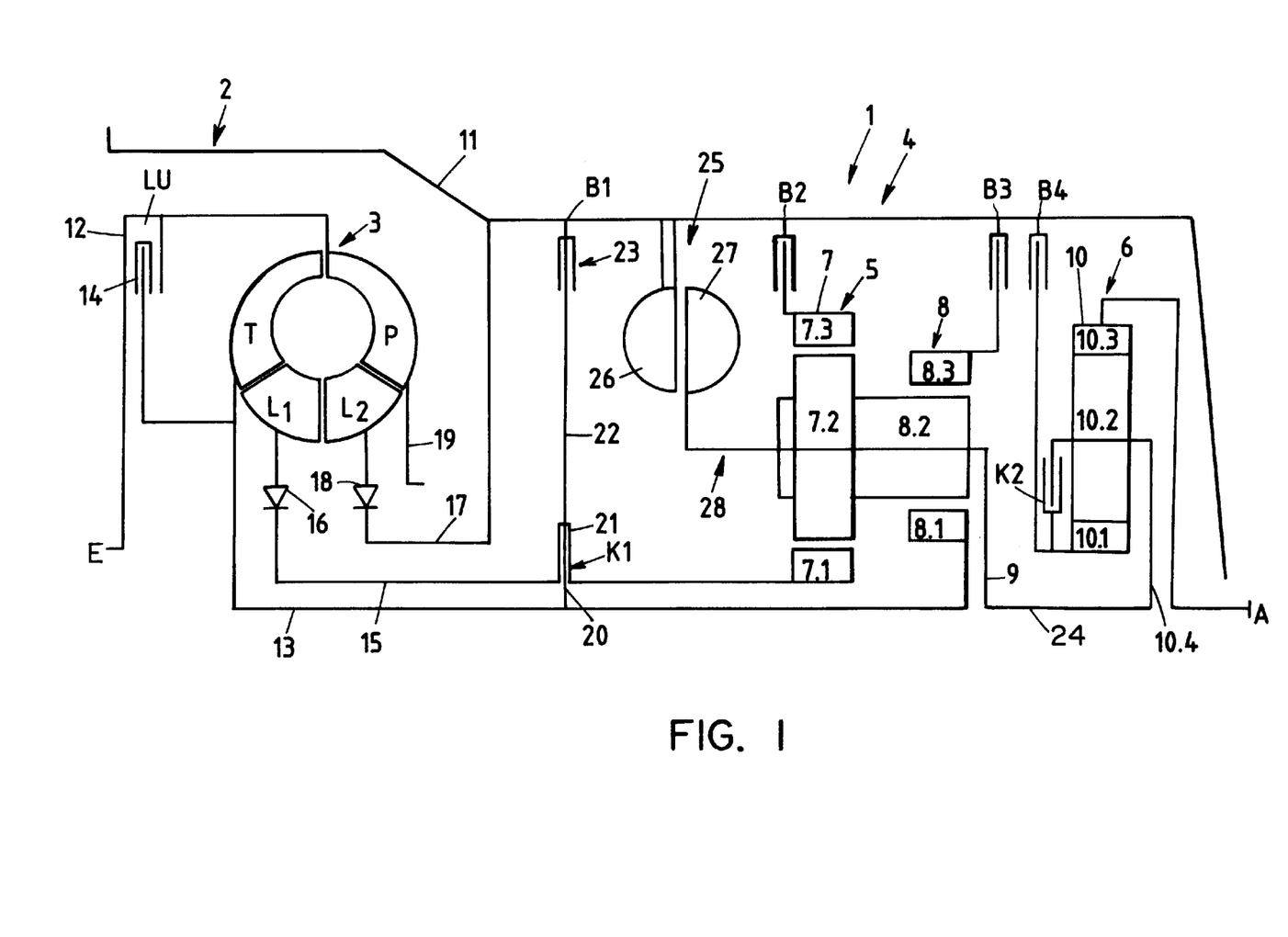
FIG. 1 shows an advantageous embodiment of a transmission configured according to the invention.

FIG. 1 shows as an example an advantageous variant of a hydrodynamic-mechanical compound transmission 1 configured according to the invention. The hydrodynamic-mechanical compound transmission 1 comprises a first hydrodynamic transmission part 2 in the form of a hydrodynamic speed/torque converter 3 and a second mechanical transmission part 4. The mechanical transmission part 4 comprises a mechanical speed/torque converter 5 and a group set connected after this in the power flow direction in traction operation. The mechanical speed/torque converter 5 is designed as a modified Ravigneaux planet wheel set. This comprises a first planet wheel set 7 and a second planet wheel set 8, which have a commonly employed planet wheel carrier 9. This represents the coupling between a transmission element of the first and second planet wheel set. The first planet wheel set 7 comprises a sun wheel 7.1, planet wheels 7.2 and a ring gear 7.3. The second planet wheel set 8 comprises a sun wheel 8.1, planet wheels 8.2 and a ring gear 8.3

The group set 6 comprises at least one planet wheel set 10, which has a sun wheel 10.1, planet wheels 10.2, a ring gear 10.3 and an arm 10.4.

The hydrodynamic-mechanical speed/torque converter 3 comprises a turbine wheel T, a pump wheel P, a first guide wheel L1 and a second guide wheel L2 and is covered by a housing 11. The pump wheel P can be connected to a transmission input shaft E, which can be connected, at least indirectly, to a drive machine serving the drive, preferably to a flywheel 12 of an internal combustion engine, so that the power from flywheel 12 is transferred to pump wheel P. The turbine wheel T is connected to rotate in unison with a turbine wheel shaft 13. To utilize the advantages of hydrodynamic torque transfer with bypass coupling, which would be:

automatic, continuous adjustment of the ratio between input and output speed corresponding to load on the output side availability of maximum torque for a startup process with high acceleration;

possibility of heat take-off by outside or surface cooling;

separation of the hydrodynamic speed/torque converter from the output, especially from the vehicle at small input speeds, and transfer of a limited residual torque so that stalling of the drive machine is no longer possible from the output side wear-free power transfer and simultaneously [avoid] the drawbacks of a hydrodynamic power transfer, which essentially consists of an often insufficiently attainable efficiency, in order to be able to operate with a hydrodynamic transmission alone, since the amount of power loss, consisting of friction and impact losses, which reduce the transferable total power, and the achieved transformation ranges for vehicle use are often not sufficient, the hydrodynamic speed/torque converter 3 is only used in the lower gears, preferably only during the startup process for power transfer. To improve transfer efficiency, the hydrodynamic speed/torque converter 3 is therefore removed from power transfer, preferably by bypassing. For this purpose, a bypass clutch 14 is arranged between the turbine wheel T and the flywheel 12 or the transmission input shaft.

The first guide wheel L1 is arranged on the turbine side between turbine wheel T and pump wheel P and is reversibly carried by a bearing. The first guide wheel L1 is connected to rotate in unison with a first guide wheel shaft 15, in which a freewheel 16 is provided between the first guide wheel L1 and the guide wheel shaft 15, which is laid out so that it transfers a torque to the first guide wheel shaft 15 when the first guide wheel L1 rotates in the opposite direction, i.e., opposite the rotational direction of turbine wheel T, and which idles when the first guide wheel L1 rotates in the normal direction, i.e., in the same direction of rotation as turbine wheel T. The second guide wheel L2 is arranged between turbine wheel T and pump wheel P on the pump side and can be connected to housing 11 via a second guide wheel shaft 17. A second freewheel 18 is arranged between the second guide wheel L2 and the second guide wheel shaft 17, by means of which the second guide wheel L2 can be coupled to the second guide wheel shaft 17, but only when the second guide wheel L2 rotates in the opposite direction to turbine wheel T.

The pump wheel P is connected to rotate in unison with a pump wheel shaft 19, which is mounted to rotate in housing 11 via a bearing.

To implement the individual speeds and to layout the individual gears, switching elements are connected to the individual elements of the hydrodynamic-mechanical compound transmission 1. A first clutch device K1 and a first brake device B1 are provided between the hydrodynamic transmission part 2 and the mechanical transmission part 4.

The turbine wheel T and the turbine wheel shaft 13 connected to rotate in unison with it is coupled to the sun wheel 8.1 of the second planet wheel set 8 of the mechanical speed/torque converter 5. The turbine wheel T and the sun wheel 8.1 of the second planet wheel set 8 are preferably arranged on a common shaft, here turbine wheel shaft 13, the turbine wheel shaft 13 then also carrying the clutch disc 20 of the first clutch K1. The first clutch K1 also has a clutch cover 21, which is connected to the first guide wheel shaft 15. The first guide wheel L1 is also connectable via the first guide wheel shaft 15 to sun wheel 7.1 of the first planet wheel set 7 of the mechanical speed/torque converter 5. The clutch cover 21 is then preferably connected in one piece to the first guide wheel shaft 15. The first guide wheel shaft 15 is designed as a hollow shaft that encloses the guide wheel shaft 13 in the peripheral direction.

A preferably disc-shaped element 22 is connected to the clutch cover 21 of the first clutch K1 and forms with it a design unit, on whose outer peripheral region 23 the first brake device B1 can engage. The first brake device B1 then serves to fix the first guide wheel L1 via guide wheel shaft 15 and/or the first sun wheel 7.1 of the first planet wheel set 7 of the mechanical speed/torque converter 5. Additional switching elements, here the switching elements in the form of brake devices B2 and B3, are connected to the individual planet wheel sets 7 and 8 of the mechanical speed/torque converter 5. In the case shown, the second brake element B2 is connected to ring gear 7.3 of the first planet wheel set 7 and the third element B3 to the ring gear 8.3 of the second planet wheel set 8 of the mechanical speed/torque converter 5. Coupling of the mechanical speed/torque converter 5 with the transmission input shaft E via the hydrodynamic speed/torque converter 3 or its bypass via the bypass clutch 14 then occurs by coupling the turbine wheel T or turbine wheel shaft 13 to a first transmission element of the mechanical speed/torque converter 5 and of the first guide wheel L1 to an additional second transmission element of the mechanical speed/torque converter 5. The sun wheel 8.1 of the second planet wheel set 8 functions here as first transmission element of the mechanical speed/torque converter 5. The sun wheel 7.1 of the first planet wheel set 7 functions as second transmission element. The shafts coupled to the two sun wheels 7.1 and 8.1, here the first guide wheel shaft 15 and the turbine wheel shaft 13, function as input shafts of the mechanical speed/torque converter 5. An additional third transmission element is connected to the transmission output shaft A via the group set 6. The planet carrier 9, which is used jointly by the two planet wheel sets 7 and 8, functions as third transmission element. The third transmission element of the mechanical speed/torque converter 5 is connected to the input formed by a first transmission element of group set 6. This connection is preferably accomplished via coupling of the third transmission element of the mechanical speed/torque converter 5 to rotate in unison with the first transmission element of group set 6. Both are preferably arranged in a common connection shaft 24. The first transmission element of group set 6 is formed by its planet carrier 10.4. A second transmission element of group set 6 is connected to rotate in unison with the transmission output shaft A of the hydrodynamic-mechanical compound transmission 1. The ring gear 10.3 of planet wheel set 10 of group set 6 functions in the depicted case as second transmission element. Whereas the mechanical speed/torque converter 5, in combination with the hydrodynamic speed/torque converter 3, serves to implement three speeds, by combination of the hydrodynamic speed/torque converter 3, mechanical speed/torque converter 5 with the group set 6 in the depicted case, six speeds can be implemented. For this purpose, an additional clutch device, here the second clutch device K2, and an additional brake device, here the fourth brake device B4, are connected to the group set 6. The fourth brake element then serves to fix sun wheel 10.1 of group set 6. The second clutch device K2 permits rigid coupling between planet carrier 10.4 and sun wheel 10.1 of planet wheel set 10 of group set 6. According to the invention, in addition to group set 6, a hydrodynamic retarder 25 is arranged in transmission 1. This assumes the function of a secondary retarder, i.e., braking of the transmission output shaft. However, spatially, the hydrodynamic retarder 25 is arranged in front of the group set 6, viewed in the power flow direction in traction operation. The hydrodynamic retarder 25 is therefore integrated in the hydrodynamic-mechanical compound transmission 1 in transmission housing 11. The hydrodynamic retarder 25 comprises a fixed stator blade wheel 26, which is connected in the depicted case fixed to housing 11. Moreover, the hydrodynamic retarder 25 has a rotor blade wheel 27, which is coupled to the output of the mechanical speed/torque converter 5 and to the input of group set 6. In the depicted case, this means that the rotor blade wheel 27, planet carrier 9 and planet carrier 10.4 can be connected to rotate in unison with each other, preferably being arranged on a common shaft. This is designated here by 28.

The spatially close arrangement of hydrodynamic retarder 25 and hydrodynamic speed/torque converter 3 makes it possible to arrange the required components for operating medium supply to the hydrodynamic components spatially close to each other in transmission 1. The required operating medium lines can then be designed very short, in particular, the same operating medium supply lines can be used both for the hydrodynamic retarder 25 and the hydrodynamic speed/torque converter 3. By analogy, this statement also applies to the required cooling loops, which can be connected directly to the operating medium supply circuits and are preferably coupled together via a common heat exchanger. The designed layout of the transmission, with hydrodynamic retarder 25 integrated in the transmission in the function as secondary retarder and the group set, permits a compact transmission design, which is suitable above all for implementation of a modular system with free right-angle output selection.

The individual elements of the operating medium supply system, for example, operating medium supply lines, gear pump, control units, filter, can also be integrated in the transmission housing. The short line has the additional advantage of limited hydrodynamic flow resistance, as well as a reduction in response times of the hydrodynamic components, especially hydrodynamic retarder 25 and hydrodynamic speed/torque converter 3. The energy efficiency with reference to the hydrodynamic components can be significantly increased on this account.

The depicted design of the hydrodynamic-mechanical compound transmission 1 represents an advantageous variant. In particular, it is possible, owing to the modular joining, to combine a base transmission, comprising the hydrodynamic transmission part 2 and the mechanical speed/torque converter 5 of the mechanical transmission part 4 with any group set 6, in which group set 6 is joined merely at the output of the base transmission, especially flanged to it. Moreover, no significant additional expense is required to integrate the hydrodynamic retarder 25 in front of the group set, preferably also in front of the mechanical speed/torque converter in the transmission housing.

The individual switching devices K1, K2 and B1 to B4 are preferably designed in a lamellar design. Other versions, however, are also conceivable.

Figure 2:
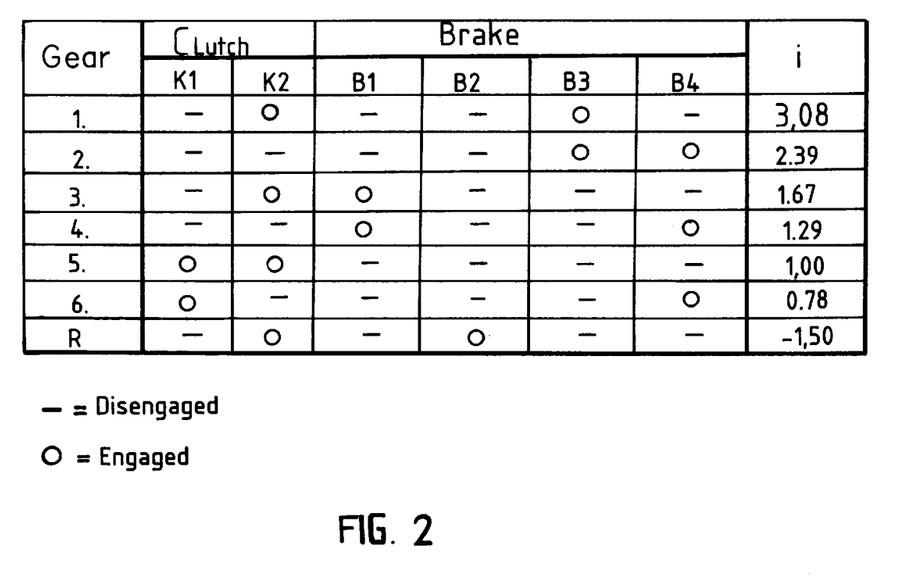
FIG. 2 shows a switching scheme to activate the individual clutch and/or braking devices for the individual transmission elements.

FIG. 2 shows one possible method of function of the transmission described in FIG. 1 with reference to a circuit diagram.

In the first speed, only the third brake element B3 is initially activated, whereas the other brake elements and clutches in mechanical speed/torque converter 5, the second brake element B2, the first brake element B1, as well as the first clutch element K1 are not activated or are disengaged. Thus, only the ring gear 8.3 of the second planet wheel set on housing 11 is fixed, whereas the other planet wheel sets of the mechanical speed/torque converter 5 mesh with each other and form a unit. The first guide wheel L1 acts in the low-gear speed range controlled by the operating mode of the first speed, reversing to the arm via the speed/torque converter 5 and reinforces the output torque. The first clutch device K2 is activated in group set 6 in this speed. This makes it possible for the ring gear 10.3 to be driven with the same speed as arm 10.4, i.e., a transmission ratio of 1 is achieved in the group switching set as a result. Switching to the second speed occurs by releasing the second clutch device K2 and activation of the fourth brake device B4. If operation is carried out without a lockup clutch, very high traction forces are obtained as in $1^{st}$ gear, since the guide wheel torque L1 is supported as drive torque via the arm of the planet wheel set. During a rise in speed ratio, a switch to the third speed stage occurs by automatic control. In this case, the third brake element is taken out of operation and the first brake element B1 activated. Moreover, the first clutch device K1, as well as the fourth brake element B4, are out of operation, and the second clutch device K2 is activated. The first guide wheel shaft 15, as well as the sun wheel 7.1 of the first planet wheel set of the mechanical speed/torque converter 5 are thus fixed relative to housing 11. The torques of the hydrodynamic torque/speed converter 3 therefore develop higher traction forces in $1^{st}$ and $2^{nd}$ gear when the lockup clutch (direct clutch or hold-gear bypass clutch) is not engaged. In $1^{st}$ and $2^{nd}$ gear the reaction moment of guide wheel L1 is supported via the planet wheel set, so that it acts as drive moment on the arm. Power transfer from the mechanical speed/torque converter 5 occurs by additional speed/torque conversion via group set 6 to output shaft A of the hydrodynamic-mechanical compound transmission 1. Switching into the fourth speed occurs by releasing the fourth brake device B4 and activating the second clutch device K2. The switching devices in the main transmission remain activated as in the third speed. With a further increase in speed ratio, a switch to the fifth speed is made. In the fifth speed only the first clutch device and the second clutch device K1 and K2 are activated. The turbine wheel shaft 13 rotates in this case in the same direction as the first guide wheel shaft 15. In the sixth speed the second clutch device K2 is released and the fourth brake device B4 activated. The power is transferred in gear 6 directly from the transmission input shaft E to the turbine wheel shaft 13 and thus to the mechanical speed/torque converter 5.

During an increase in speed ratio, bypassing of the hydrodynamic speed/torque converter 3 generally occurs by means of the bypass clutch 14. The power is then transferred directly from the transmission input shaft E to the turbine wheel shaft 13 and thus to the mechanical speed/torque converter 5. The hydrodynamic speed/torque converter is therefore used only in $1^{st}$ and $2^{nd}$ nd gear.

The three main speeds are thus split by a group set 6 into two partial speeds, so that ultimately a multiple speed transmission is produced, in the depicted case, a six-speed transmission. This is achieved, in particular, by alternating activation of the switching devices on group set 6. In the first of the two partial speeds, the power applied by the mechanical speed/torque converter 5 to its output shaft is transferred with a transmission ratio of 1 to the transmission output shaft A. In the second partial speed, which follows the first partial speed, a speed increase at the output of the mechanical speed/torque converter 5 occurs via group set 6.

The hydrodynamic retarder 25, which is connected to the output shaft A of transmission 1 via group set 6, therefore must be adjusted only in each second switching with respect to its filling. This means that the filling must be regulated only in the next gear but one. To achieve the same braking torques independently of the gear, filling of the retarder during a speed increase of the secondary group must be greater than at the "direct transmission ratio" of 1.0. Depending on the switchback strategy, filling must be adjusted when all the gears are switched back in succession. However, filling need not be adjusted if switchback only occurs to every second gear.

The variant depicted in FIGS. 1 and 2 of a mechanical-hydrodynamic compound transmission 1 represents an advantageous variant. The arrangement or layout of the mechanical speed/torque converter and/or group set 6, however, can also occur differently.

Figure 3:
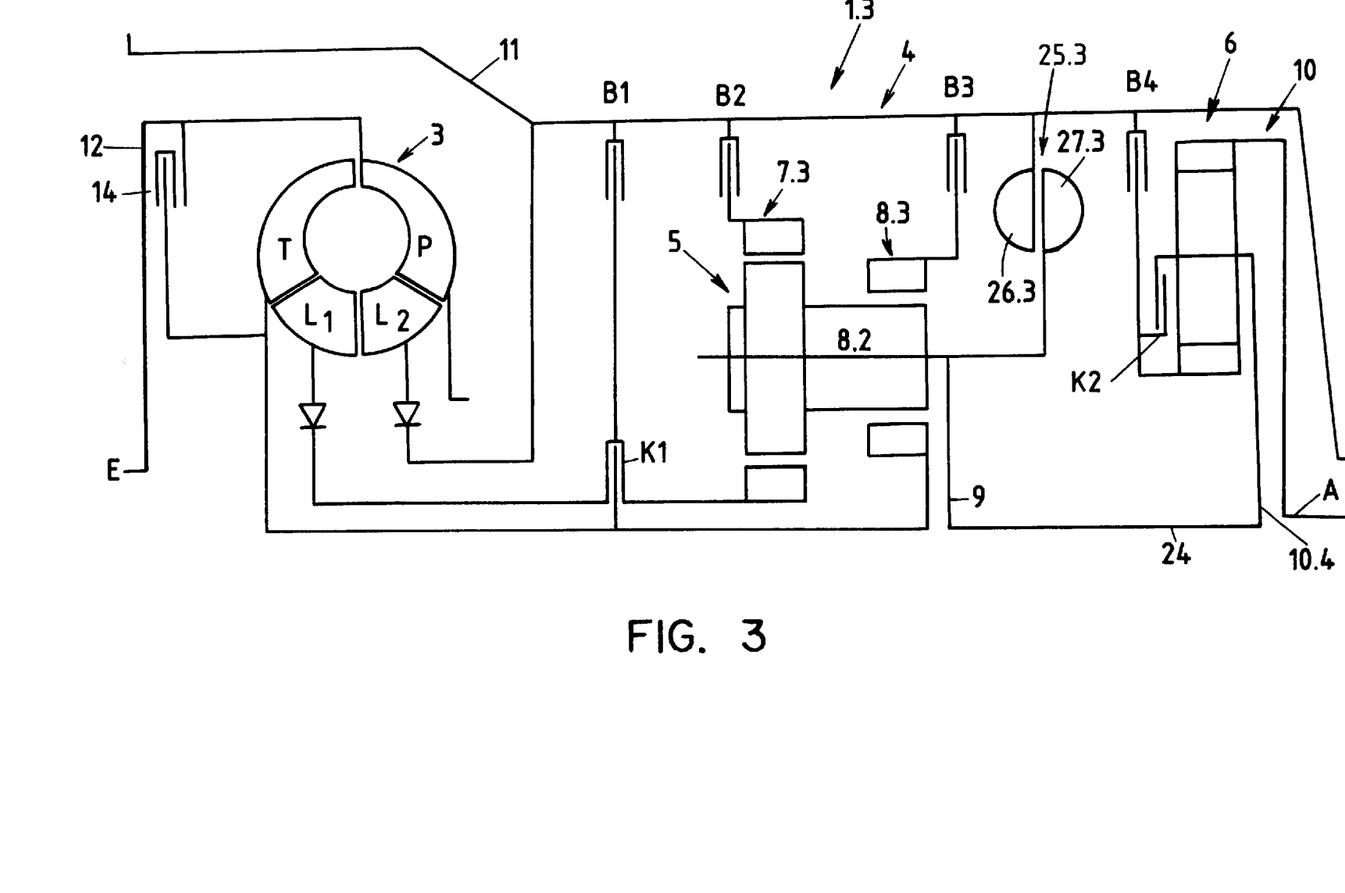
FIG. 3 shows an additional embodiment of a transmission configured according to the invention with integrated secondary set and arrangement of the hydrodynamic retarder between the mechanical speed/torque converter and the mechanical secondary stage.

FIG. 3 shows another variant of a mechanical-hydrodynamic compound transmission 1 configured according to the invention, here 1.3, comprising a hydrodynamic transmission part 3 and a mechanical transmission part 4, in which the mechanical transmission part 4 has a so-called group set, in addition to the mechanical speed/torque converter. The basic design of the hydrodynamic transmission part 2 and the mechanical speed/torque converter 5 corresponds to that described in FIG. 1, and the same reference numbers are therefore used for the same elements. By analogy, coupling between the hydrodynamic transmission part 2 and the mechanical speed/torque converter 5 of the mechanical transmission part 4 is also configured the same. Here again a group set 6 is connected after the mechanical speed/torque converter 5. The output of the mechanical speed/torque converter 5 then also forms the input of group set 6. The method of function of transmission 1.3 does not differ from method of function of the transmission 1 described in FIG. 1. However, according to the invention, the hydrodynamic retarder 25.3 here is spatially arranged in front of the group set 6 designed as secondary group, but spatially arranged after the mechanical speed/torque converter 5. Here again the stator blade wheel 26.3 is fastened to housing 11 of transmission 1.3. The rotor blade wheel 27.3 is coupled to the clutch between the output of the mechanical speed/torque converter 5 and the input of group set 6, the connection shaft 24 and the arm 9 or 10.4. The total transmission is therefore lengthened only by the arrangement of hydrodynamic retarder 25.3 relative to the 3-speed transmission arrangement described in the prior art, whereas the total transmission length remains unchanged relative to the solution proposed in FIG. 1. Here too there is a possibility of designing the total transmission 1.3 in the form of a module composed of individual transmission elements, because of the very compact design. The hydrodynamic retarder 25.3 can be a component of the spatial partial region of the mechanical speed/torque converter 5 or the secondary set 6. The transmission element is preferably offered so that the hydrodynamic retarder is a component of the region of transmission 1.3, which can be defined by the mechanical speed/torque converter 5. Secondary groups in a variety of versions can be simply flanged onto this base transmission. It is therefore possible to develop a multiple speed transmission, preferably a six-speed transmission, from a simple threespeed transmission, which is determined by coupling of the hydrodynamic speed/torque converter 3 to the mechanical speed/torque converter 5. Depending on the use requirements, a fully functional base transmission with three gears and integrated braking function in the transmission can be equipped by means of the hydrodynamic retarder as a three-speed transmission, or by retrofitting with the secondary set in the form of a group set as a multiple speed transmission in a simple manner.

Figure 4A:
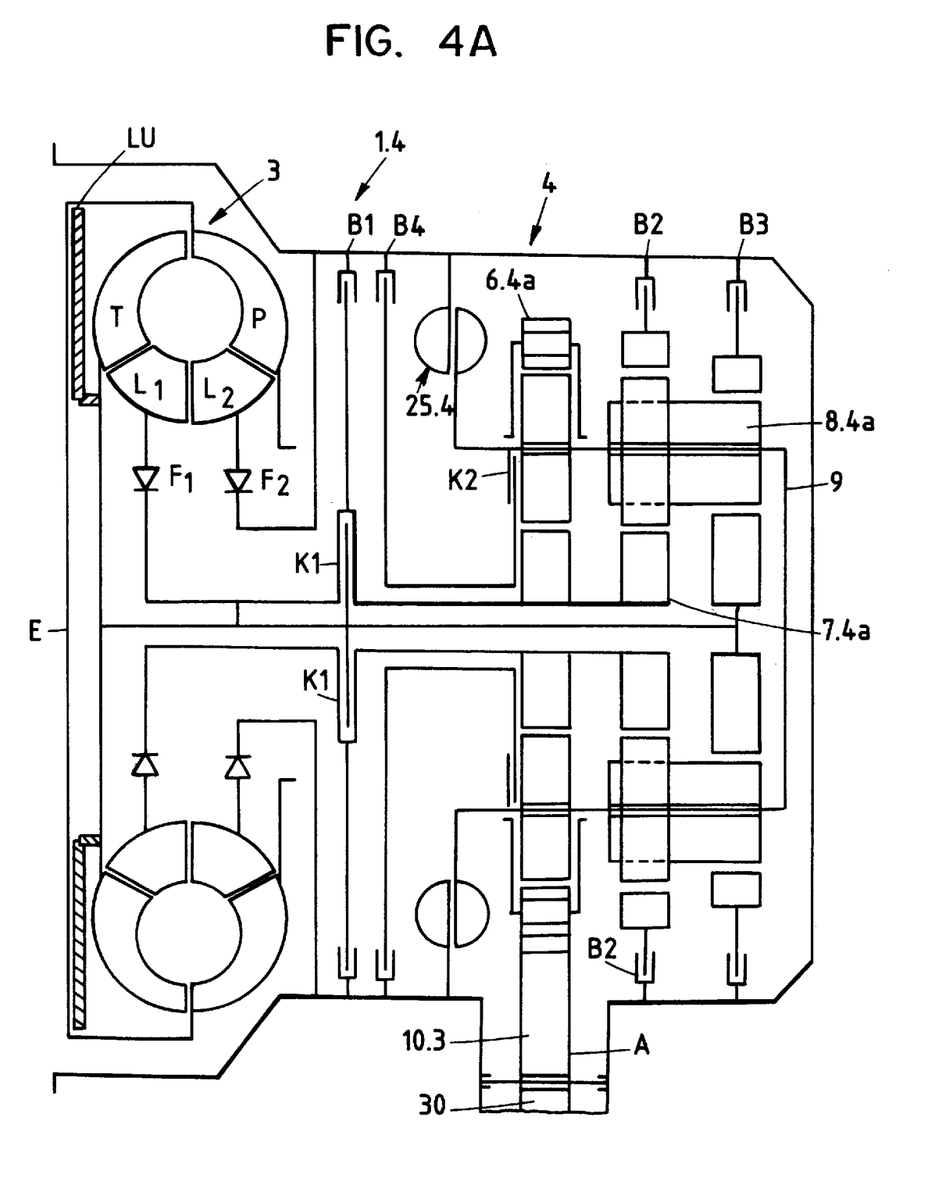
FIG. 4a shows a variant of a transmission configured according to the invention with integrated secondary stage before the mechanical speed/torque converter, with arrangement of the hydrodynamic retarder in front of the secondary stage.
Figure 4B:
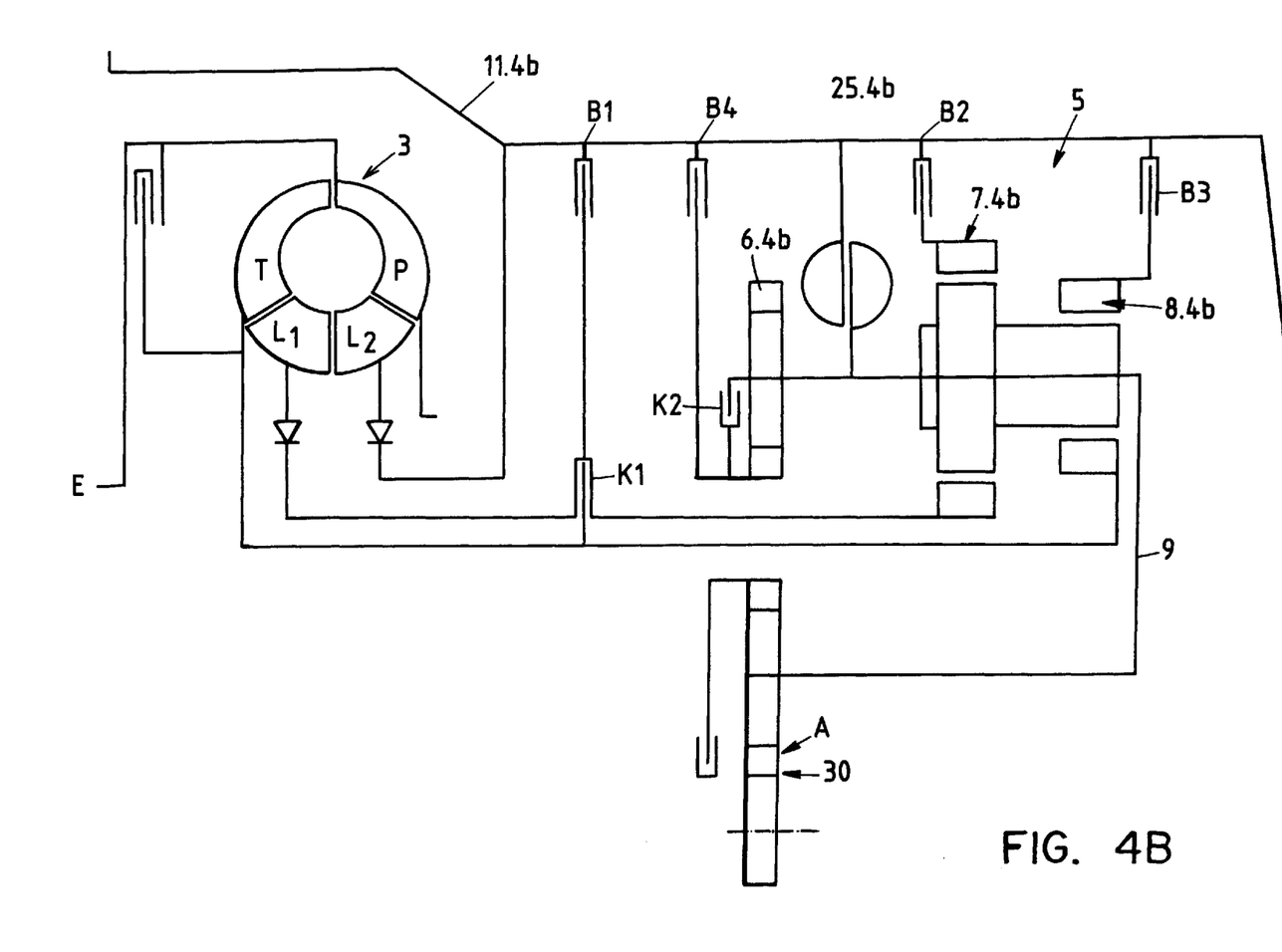
FIG. 4b shows a variant of a transmission configured according to the invention with arrangement of the mechanical secondary stage in front of the mechanical speed/torque converter, and arrangement of the hydrodynamic retarder between the mechanical secondary stage and the mechanical speed/torque converter.

FIGS. 4a and 4b show another modification according to the invention of a base transmission, comprising a hydrodynamic transmission part 2 in the form of a hydrodynamic speed/torque converter 3, as well as a mechanical transmission part 4 with a mechanical speed/torque converter 5. The transmission is designated 1.4 here. The basic design and function corresponds to that described in FIGS. 1, 2 and 3, for which reason the same reference numbers are also used for the same elements. Here again the secondary set, i.e., group set 6, is designated 6.4a or 6.4b and arranged coaxial to the main transmission. The secondary set or secondary stage, referred to the arrangement of transmission input shaft E and transmission output shaft A, is arranged in front of the mechanical speed/torque converter. The same switching devices as in the previously described transmission components are connected to it, i.e., a fourth brake element B4 and a second clutch element K2. The secondary set 6 is also designed as a planet wheel set. Two possibilities are obtained for the hydrodynamic retarder 25.4, here designated 25.4a, with respect to its arrangement. A first possibility, as also shown in FIG. 4a, consists of arranging this spatially in front of the secondary set 6.4a. A second possibility consists, as shown in FIG. 4b, of arranging the hydrodynamic retarder 25.4b between the mechanical secondary set 6.4b and the mechanical speed/torque converter 5. The transmission output shaft A in the depicted case is not arranged coaxial to the transmission input shaft, but parallel to it. The take-off, i.e., the transmission output, is formed from the ring gear of the secondary stage or a gear 30 or other transfer devices that mesh with it. The main take-off therefore lies parallel to a theoretically imagined axis of symmetry of the transmission. There is the additional possibility of using the output of the mechanical speed/torque converter 5 to drive the secondary units, for example, by coupling of the arm of planet wheel set 7.4a or 8.4a to a secondary output shaft $A_{secondary}$.

Figure 5A:
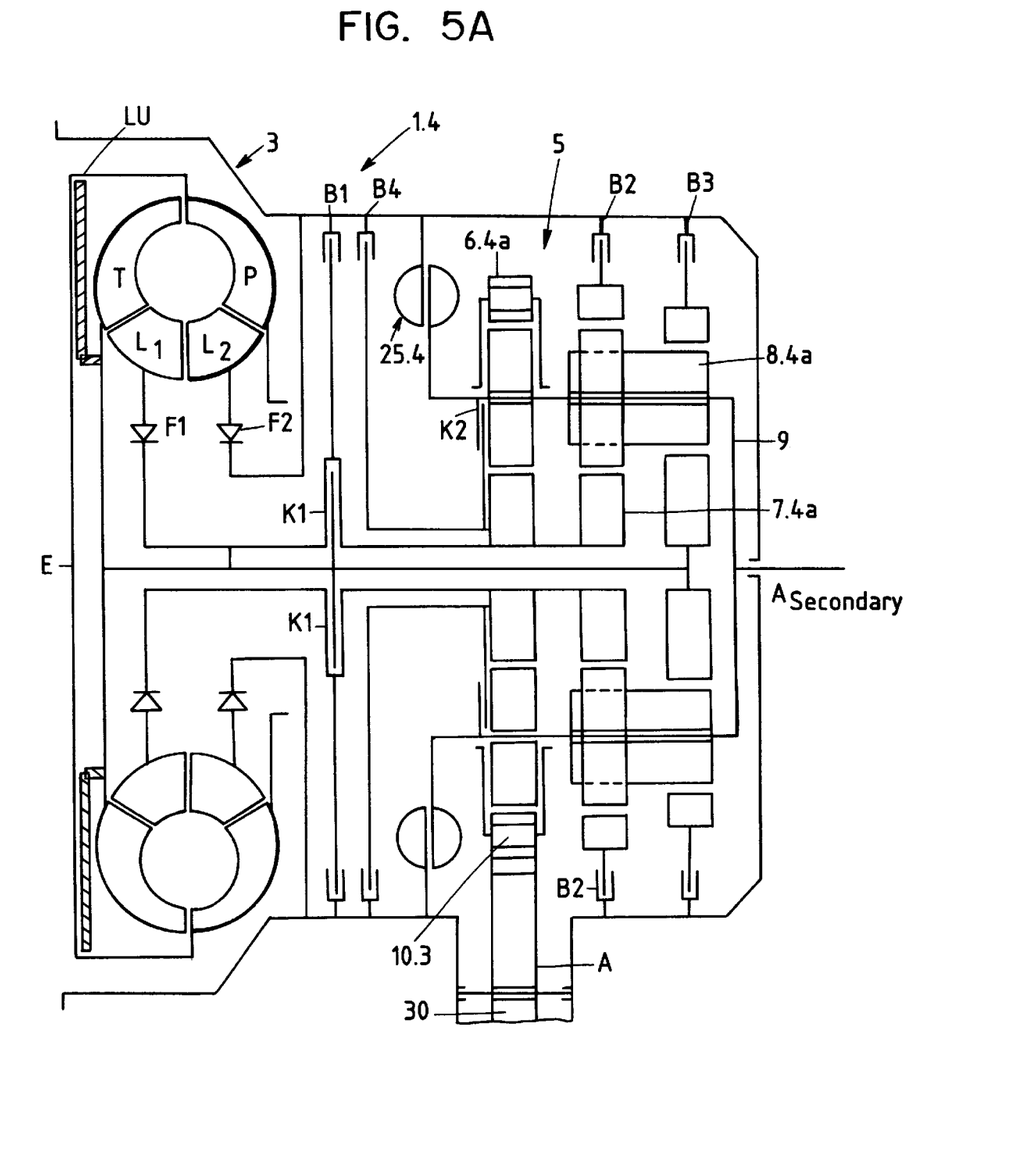
FIGS. 5a and 5b show variants according to FIGS. 4a and 4b, with additional suitability for speed-dependent drive of an additional unit.

FIG. 5a shows a variant according to FIG. 4a with an additionally provided drive possibility for a secondary unit. The secondary output $A_{secondary}$ is then coupled to the output of the mechanical speed/torque converter and thus the input of the mechanical secondary stage 6.

Figure 5B:
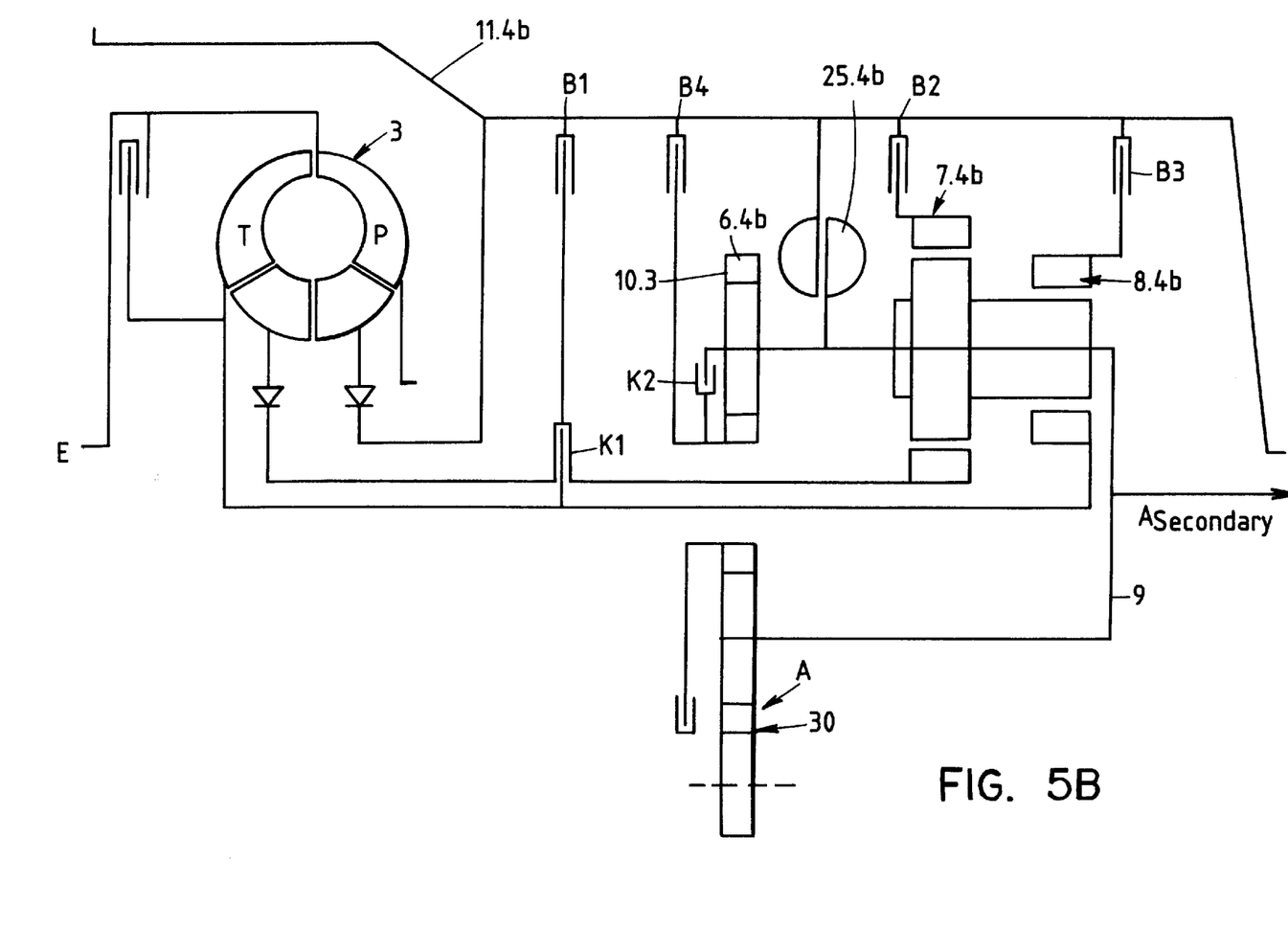

FIG. 5b shows a variant according to FIG. 4b for a 6-speed transmission, in which the hydrodynamic retarder 25.4b is arranged between secondary stage 6 and the mechanical speed/torque converter 5. In this case as well, the mechanical secondary stage 6 is arranged spatially in front of the mechanical speed/torque converter, viewed from the transmission input shaft E to the transmission output shaft A. This variant also represents, like the variant of FIG. 4a, a very compact transmission unit 1.4b. The main take-off A occurs via the transmission output, which is formed here by the ring gear 10.3 of secondary set 6.4b.

FIGS. 4 and 5 show an advantageous connection of secondary set 6 to the mechanical speed/torque converter, in which the configuration of the transmission unit is not restricted to this connection, i.e., coupling of arm 10.4 and 9 of secondary set 6 or of the mechanical speed/torque converter 5. Other connection possibilities are also conceivable.

There is also the possibility (not shown here in detail) of implementing secondary take-offs by arranging the secondary set 6, viewed in the power flow direction from the transmission input shaft or the transmission output shaft, behind the mechanical speed/torque converter 5, i.e., an arrangement according to FIG. 1. The secondary output can then be implemented by providing an addition planet wheel set in the power flow direction in front of the mechanical speed/torque converter 5 and coaxial to it, in which at least one element of the planet wheel set is coupled to the output of the mechanical speed/torque converter. The planet wheel set is then arranged according to the secondary set in FIGS. 5a and 5b. This coupling preferably occurs by connecting the arms. Only a brake device is appropriately connected to the planet wheel set, so that the ring gear of the planet wheel set forms the secondary output.

Figure 6:
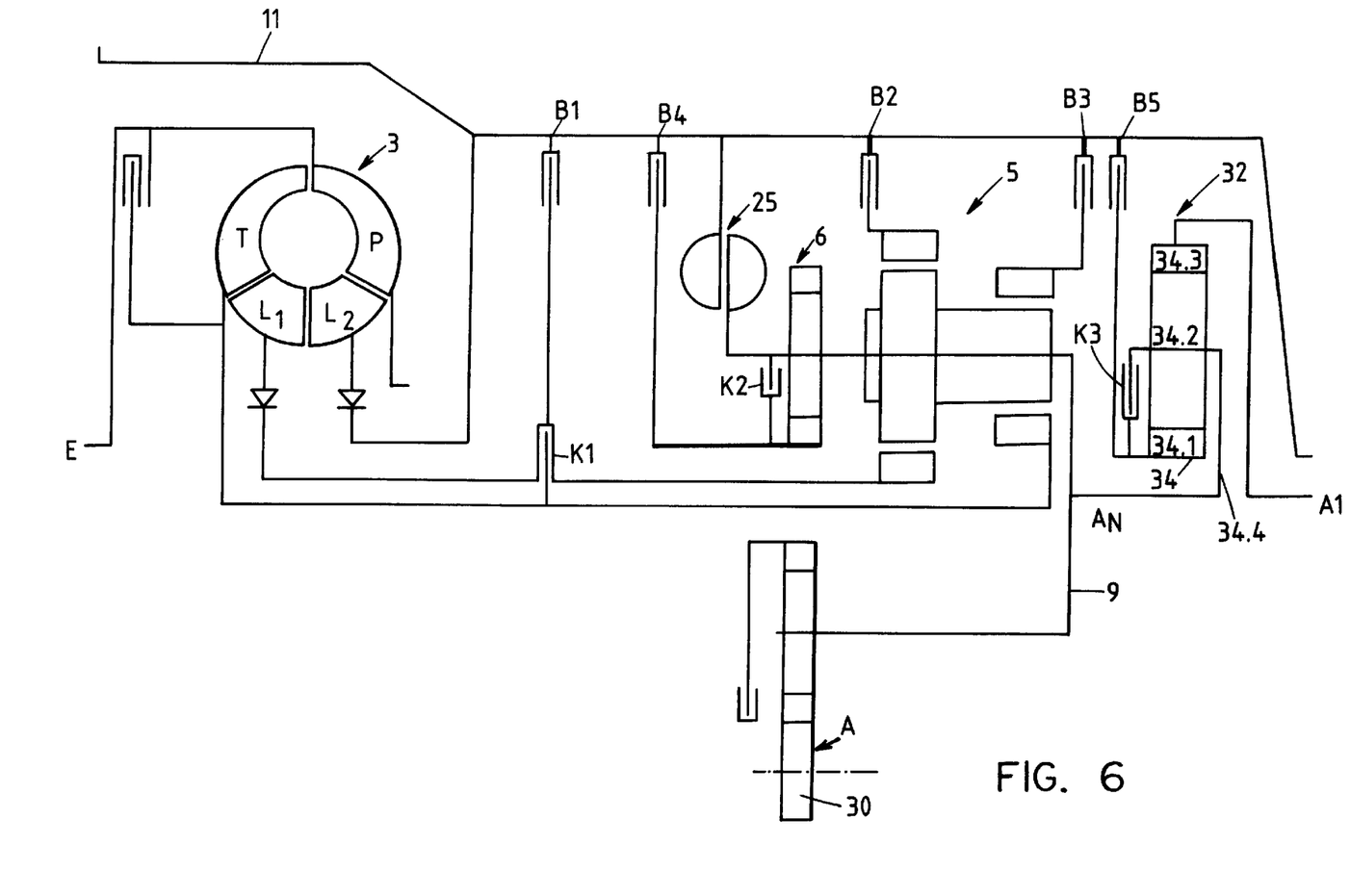
FIG. 6 shows a variant corresponding to FIG. 5b for use in all-wheel drive.

FIG. 6 shows as an example, with reference to a variant according to FIG. 5b, connection to a secondary output to make the overall transmission unit suitable as a permanent or switchable all-wheel drive. The secondary output $A_{secondary}$ is then connected to an additional second secondary stage 32, which is preferably designed as a simple planet wheel set similar to secondary stage 6. The planet wheel set is designated 34 and comprises at least one sun wheel 34.1, planet wheels 34.2, and arm 34.4 and a ring gear 34.3. The input of this secondary stage 32 is formed by arm 34.4. This means that this is in drive connection, at least indirectly, with the secondary take-off or secondary output shaft $A_{secondary}$. The secondary stage 32 is preferably designed identical to secondary stage 6, so that uniform power distribution to both secondary stages is made possible, and they are identically laid out, with consideration of the transmission elements with respect to the power being transferred to the axles or wheels of the vehicle. Moreover, the switching devices (a brake device B5 and an additional clutch device K3) are connected to secondary stage 32. Connection occurs to the individual transmission elements of secondary stage 32 in similar fashion to secondary stage 6. This means that the additional fifth brake element is connected to sun wheel 34.1, whereas the additional third clutch element K3 permits coupling between the planet carrier and sun wheel. The two outputs of the secondary stages 6 and 32 are each formed here by a ring gear. The secondary stage 32 is then characterized by the possibility of coaxial arrangement of output Al to transmission input shaft E. The output A on secondary set 6 is arranged parallel to the transmission input shaft.

FIG. 6 shows as an example a possible version with secondary output suitable for an all-wheel drive. Depending on the vehicle type and arrangement of the vehicle engine relative to the transmission, this is incorporated either along or across the direction of travel, so that, owing to the angular arrangement, the individual outputs must be configured so that they form a drive of parallel arranged drive elements, preferably axles. This is accomplished simply by designing one of the ring gears of the two secondary sets with oblique toothing and meshing it with a bevel gear. Theoretically, there is also the possibility of configuring the secondary output 32 or the drive elements coupled to it as engageable and disengageable. This occurs in simple manner by means of a clutch element (not shown here), which permits interruption of power flow from secondary output 32 to the Transmission elements connected to it.

The variants described in FIGS. 1 to 4 represent advantageous embodiments of the hydrodynamic-mechanical compound transmission designed according to the invention. The transmission is preferably designed as a multiple speed transmission, comprising six speeds. However, it is also conceivable to arrange the hydrodynamic retarder in similar fashion in the main transmission, which serves to implement three speeds. By analogy, this also applies to the modifications according to FIGS. 5 and 6.

Figure 7:
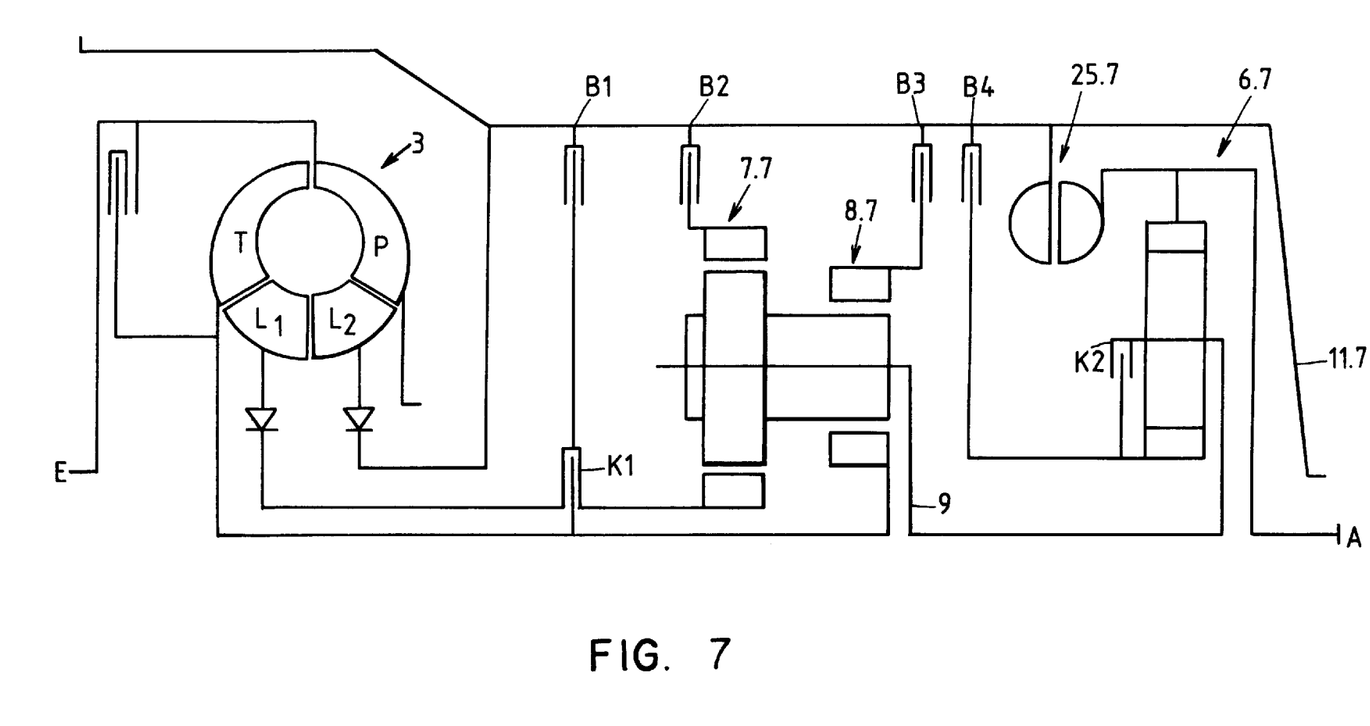
FIG. 7 shows a variant of a transmission module with hydrodynamic retarder before the mechanical secondary set.

FIG. 7 shows an additional modification of variants according to FIGS. 1 to 4 of a mechanical-hydrodynamic compound transmission 1.7. The basic design corresponds essentially to that described in FIG. 3, but in which connection of the hydrodynamic retarder 25.7 is different relative to that of FIG. 3. In the depicted case the rotor blade wheel 27.7 of hydrodynamic retarder 25.7 is directly coupled to the output shaft A or the ring gear 10.3 of secondary set 6.

What is claimed is:

1. Hydrodynamic-mechanical compound transmission with a transmission input shaft and a transmission output shaft;

a hydrodynamic transmission part and a mechanical transmission part, comprising at least one speed/torque converter device;

an output of the mechanical transmission part is in drive connection, at least indirectly, with the transmission output shaft the hydrodynamic-mechanical compound transmission comprising:

a hydrodynamic retarder comprising a stator and a rotor blade wheel;

the hydrodynamic retarder is integrated in a transmission housing and spatially connected in front of the output shaft of the mechanical transmission part with respect to the power flow direction in traction operation; and the rotor blade wheel of the hydrodynamic retarder connectable to the output shaft of the mechanical transmission part.

2. Hydrodynamic-mechanical compound transmission according to claim 1, wherein:

the mechanical transmission part comprises at least one mechanical secondary set; and an output of the mechanical speed/torque converter is connected to the mechanical secondary set.

3. Hydrodynamic-mechanical compound transmission according to claim 1, wherein the hydrodynamic retarder is spatially arranged in front of the mechanical secondary set with respect to the power flow direction in traction operation.

4. Hydrodynamic-mechanical compound transmission according to claim 1, wherein viewed in the power flow direction in traction operation, the hydrodynamic retarder is spatially arranged in front of the mechanical speed/torque converter.

5. Hydrodynamic-mechanical compound transmission according to claim 1, wherein the hydrodynamic retarder viewed in the power flow direction in traction operation, is arranged spatially behind the mechanical speed/torque converter.

6. Hydrodynamic-mechanical compound transmission according to claim 1, wherein:

the mechanical speed/torque converter is designed as a planet wheel set unit, comprising at least a first planet wheel set and a second planet wheel set; and the planet wheel sets are designed and arranged so that they form a connection between the output shaft of the mechanical speed/torque converter and the input of the mechanical speed/torque converter viewed in the power flow direction in traction operation.

7. Hydrodynamic-mechanical compound transmission according to claim 6, wherein:
the first planet wheel set is arranged spatially in front of the second planet wheel set, viewed in the power flow direction in traction operation;
with a clutch between a first transmission element of the first planet wheel set and a first transmission element of the second planet wheel set; and
the clutch is connected to the output of the mechanical speed/torque converter.

8. Hydrodynamic-mechanical compound transmission according to claim 7, wherein the first transmission element of the first planet wheel set and the first transmission element of the second planet wheel set are each formed by an arm of the planet wheel sets.

9. Hydrodynamic-mechanical compound transmission according to claim 7, further comprising:
means for at least indirect coupling of an additional second element of the first planet wheel set and an additional second element of the second planet wheel set to the transmission input shaft.

10. Hydrodynamic-mechanical compound transmission according to claim 9, wherein the additional second transmission element of the first planet wheel set is in drive connection with a guide wheel of the hydrodynamic speed-torque converter;
and further comprising means for alternating coupling of the second element of the second planet wheel set to the turbine wheel and/or the transmission input shaft.

11. Hydrodynamic-mechanical compound transmission according to claim 10, wherein the means for alternating coupling is a switchable clutch device.

12. Hydrodynamic-mechanical compound transmission according to claim 7, wherein the second transmission element of the first planet wheel set is formed from the sun wheel of the first planet wheel set and the second element of the second planet wheel set is formed from the sun wheel of the second planet wheel set.

13. Hydrodynamic-mechanical compound transmission according to claim 9, wherein the first guide wheel is coupled via a freewheel to the sun wheel of the first planet wheel set of the mechanical speed/torque converter.

14. Hydrodynamic-mechanical compound transmission according to claim 7, wherein a second guide wheel of the hydrodynamic speed/torque converter is coupled to the transmission housing via a freewheel.

15. Hydrodynamic-mechanical compound transmission according to claim 7, wherein a number of switching devices in the form of clutches and/or brake devices are connected to the mechanical speed/torque converter.

16. Hydrodynamic-mechanical compound transmission according to claim 15, wherein the second element of the first planet wheel set can be fixed by means of a first brake device.

17. Hydrodynamic-mechanical compound transmission according to claim 15, wherein a third element of the first planet wheel set can be fixed by means of a second brake device.

18. Hydrodynamic-mechanical compound transmission according to claim 15, wherein a third transmission element of the second planet wheel set can be fixed by means of a third brake device.

19. Hydrodynamic-mechanical compound transmission according to claim 7, further comprising means for coupling the second transmission element of the first planet wheel set and the second transmission element of the second planet wheel set and thus the first guide wheel shaft to the turbine wheel shaft.

20. Hydrodynamic-mechanical compound transmission according to claim 19, wherein the means for coupling is a clutch device.

21. Hydrodynamic-mechanical compound transmission according to claim 15, wherein the switching device designed as brake devices and/or clutch devices are designed in lamellar design.

22. Hydrodynamic-mechanical compound transmission according to claim 2, wherein the secondary set comprises at least one planet wheel set, comprising a sun wheel, a ring gear, planet wheels and a planet carrier.

23. Hydrodynamic-mechanical compound transmission according to claim 22, wherein the input of each planet wheel set is formed by the planet carrier of the planet wheel set.

24. Hydrodynamic-mechanical compound transmission according to claim 22, wherein the output of the planet wheel set is formed by the ring gear of the planet wheel set.

25. Hydrodynamic-mechanical compound transmission according to claim 22, further comprising:
a fourth brake device and a second clutch device connected to the planet wheel set;
the fourth brake device being connectable to the sun wheel of the planet wheel set; and
the second clutch device serves for coupling of the sun wheel to the planet carrier of the planet wheel set.

26. Hydrodynamic-mechanical compound transmission according to claim 2, wherein an output of the secondary set is coupled to an additional speed/torque converter device.

27. Hydrodynamic-mechanical compound transmission according to claim 26, wherein the additional speed/torque converter device has a first output that can be connected to a secondary unit to be driven.

28. Hydrodynamic-mechanical compound transmission according to claim 1, further comprising:
an operating medium supply system for the hydrodynamic retarder and hydrodynamic transmission part; and
means for supplying operating medium to the hydrodynamic retarder and/or the hydrodynamic transmission element from the operating medium supply system.

29. Hydrodynamic-mechanical compound transmission according to claim 28, wherein the operating medium supply system is integrated in the transmission housing.

30. Hydrodynamic-mechanical compound transmission according to claim 2, wherein the mechanical speed/torque converter and the secondary set are designed so that essentially constant speed jumps are achieved between the individual speeds with a speed jump value of $\leq 1.45$ from a first to a second gear.

31. Hydrodynamic-mechanical compound transmission according to claim 1, wherein:
the hydrodynamic-mechanical compound transmission is spatially dividable into two transmission parts—a first transmission part and a second transmission part;
the first transmission part is designed as a base transmission and comprises the hydrodynamic transmission part and the mechanical speed/torque converter of the mechanical transmission part;
the second transmission part can be arranged coaxial to the base transmission and comprises at least one mechanical secondary set.

32. Hydrodynamic-mechanical compound transmission according to claim 31, wherein the hydrodynamic retarder is integrated in the base transmission.

33. Hydrodynamic-mechanical compound transmission according to claim 31, wherein the hydrodynamic retarder is integrated in the second transmission part.

* * * * *